(12) United States Patent
Scully

(10) Patent No.: US 7,818,109 B2
(45) Date of Patent: Oct. 19, 2010

(54) METHODS AND APPARATUS FOR SECURING AN ACTIVE VEHICLE SEAT

(75) Inventor: Linda T. Scully, Dunstable, MA (US)

(73) Assignee: Bose Corporation, Framingham, MA (US)

( * ) Notice: Subject to any disclaimer, the term of this patent is extended or adjusted under 35 U.S.C. 154(b) by 271 days.

(21) Appl. No.: 11/877,530

(22) Filed: Oct. 23, 2007

(65) Prior Publication Data

US 2009/0105910 A1 Apr. 23, 2009

(51) Int. Cl.
*B60N 2/08* (2006.01)

(52) U.S. Cl. .............................. 701/49; 180/287; 70/261

(58) Field of Classification Search .................. 701/49; 180/326–331, 287; 296/65.01–65.18; 70/261
See application file for complete search history.

(56) References Cited

U.S. PATENT DOCUMENTS

| | | | |
|---|---|---|---|
| 3,701,499 A | 10/1972 | Schubert et al. | |
| 3,990,668 A | 11/1976 | Thompson et al. | |
| 4,198,025 A | 4/1980 | Lowe et al. | |
| 4,397,440 A | 8/1983 | Hall et al. | |
| 4,494,114 A * | 1/1985 | Kaish | 340/5.31 |
| 5,529,372 A * | 6/1996 | Cohen | 297/217.3 |
| 5,564,520 A | 10/1996 | Forsythe | |
| 5,801,462 A | 9/1998 | Yagoto et al. | |
| 5,931,533 A | 8/1999 | Lance et al. | |
| 5,975,508 A | 11/1999 | Beard | |
| 6,059,253 A | 5/2000 | Koutsky et al. | |
| 6,193,297 B1 * | 2/2001 | Vandermolen | 296/68.1 |
| 6,335,679 B1 * | 1/2002 | Thomas et al. | 340/426.13 |
| 6,371,459 B1 | 4/2002 | Schick et al. | |
| 6,625,517 B1 | 9/2003 | Bogdanov et al. | |
| 6,683,543 B1 | 1/2004 | Yeo et al. | |
| 6,719,258 B2 | 4/2004 | Bryngelson et al. | |
| 6,746,071 B2 * | 6/2004 | Farino | 296/65.16 |
| 7,116,100 B1 | 10/2006 | Mock et al. | |
| 2002/0194476 A1 | 12/2002 | Lewis et al. | |
| 2004/0000324 A1 | 1/2004 | Masui et al. | |
| 2004/0003243 A1 | 1/2004 | Fehr et al. | |
| 2005/0184855 A1 * | 8/2005 | Burchette, Jr. | 340/5.53 |
| 2006/0237885 A1 | 10/2006 | Paillard et al. | |
| 2006/0261647 A1 * | 11/2006 | Maas et al. | 297/216.1 |
| 2007/0113070 A1 | 5/2007 | Lackritz | |
| 2007/0265738 A1 | 11/2007 | Saito | |

FOREIGN PATENT DOCUMENTS

| | | |
|---|---|---|
| DE | 10332452 | 2/2005 |
| EP | 412853 | 2/1991 |
| EP | 0723896 | 7/1996 |

(Continued)

OTHER PUBLICATIONS

Chinese Office Action dated Jun. 26, 2009 for CN Appl. No. 200680040972.7.

(Continued)

*Primary Examiner*—Thomas G Black
*Assistant Examiner*—Peter D Nolan

(57) ABSTRACT

A method for operating an active vehicle seat in a vehicle includes detecting a triggering event related to a security threat to the active vehicle seat. An operation of the active vehicle seat is disabled in response to the detected triggering event. The operation of the active vehicle seat is enabled by providing authentication of an authorized user.

17 Claims, 3 Drawing Sheets

FOREIGN PATENT DOCUMENTS

| | | |
|---|---|---|
| EP | 0724343 | 7/1996 |
| EP | 1028536 | 8/2000 |
| EP | 1512559 A2 | 3/2005 |
| GB | 2402794 | 12/2004 |
| JP | 2003288623 | 10/2003 |
| JP | 2004352128 | 12/2004 |
| JP | 2005217907 A | 8/2005 |
| WO | 2006134417 | 12/2006 |

OTHER PUBLICATIONS

International Search Report and Written Opinion dated Nov. 28, 2008, issued in International Application No. PCT/US2008/077418, filed Sep. 24, 2008.

Bratland, Tamara, et al., Linear Position Sensing Using Magnetoresistive Sensors, Magnetic Sensors, Honeywell Solid State Electronics, http://www.ssec.honeywell.com/magnetic/datasheets/linearpositionsensing.pdf Retrieved from the Internet Apr. 9, 2008.

International Search Report and Written Opinion dated May 2, 2007 for Appl. No. PCT/US06/038319.

International Preliminary Report on Patentability dated May 6, 2008 for Appl. No. PCT/US06/038319.

International Preliminary Report on Patentability dated May 6, 2010 for PCT/US2008/077418.

* cited by examiner

METHODS AND APPARATUS FOR SECURING AN ACTIVE VEHICLE SEAT

FIELD OF THE INVENTION

This description relates to active suspending.

BACKGROUND OF THE INVENTION

Typical vehicle seats are installed by fastening the seat to a chassis of the vehicle using bolts. The seat can include various slides for adjusting the seat relative to the steering wheel. The seat can also include various motors to adjust the height, lumbar region, seat back angle, seat tilt, etc.

SUMMARY OF THE INVENTION

In general, in one aspect, the invention features a method for operating an active vehicle seat in a vehicle comprising detecting a triggering event related to a security threat to the active vehicle seat, disabling an operation of the active vehicle seat in response to the detected triggering event; enabling the operation of the active vehicle seat by providing authentication of an authorized user.

Implementations of the invention may include one or more of the following features. The triggering event comprises at least one of a severed electrical, mechanical, pneumatic, and hydraulic connection to the active vehicle seat. Disabling the operation comprises setting the active vehicle seat to a predetermined orientation. The predetermined orientation positions the active vehicle seat so as to render the vehicle substantially inoperable. Disabling the operation comprises disconnecting power to the active vehicle seat. Disabling the operation comprises outputting an audible signal. Providing authentication comprises entering a password. Providing authentication comprises entering biometric data. Providing authentication comprises turning a key in a lock. Providing authentication comprises engaging a security card with a card reader.

In general, in another aspect, the invention features an active vehicle seat comprising a vehicle seat; an electromagnetic actuator that actively suspends the vehicle seat during operation; and a controller that detects a triggering event related to a security threat to the active vehicle seat, the controller disabling the operation of the active vehicle seat in response to the detected triggering event and subsequently enabling the operation of the active vehicle seat by providing authentication of an authorized user.

Implementations of the invention may include one or more of the following features. The triggering event comprises at least one of a severed electrical, mechanical, pneumatic, and hydraulic connection to the active vehicle seat. The controller disables the operation of the active vehicle seat by setting the active vehicle seat to a predetermined orientation. The predetermined orientation positions the active vehicle seat so as to render a vehicle supporting the active vehicle seat substantially inoperable. The controller disables the operation of the active vehicle seat by disconnecting power to the active vehicle seat. The active vehicle seat further comprises an authentication device coupled to the controller for enabling the operation the active vehicle seat. The authentication device comprises a keypad for entering of a preset security code. The authentication device comprises a lock for engagement with a corresponding key. The authentication device comprises a card reader for engagement with a security card. The authentication device comprises a biometric sensor for receiving biometric data. The active vehicle seat further comprises a loudspeaker that outputs an audible signal in response to the triggering event. The active vehicle seat further comprises a wireless transmitter that signals a corresponding wireless receiver in response to the triggering event.

In general, in another aspect, the invention features an active vehicle seat comprising means for detecting a triggering event related to a security threat to the active vehicle seat; means for disabling an operation of the active vehicle seat in response to the detected triggering event; and means for enabling the operation of the active vehicle seat by providing authentication of an authorized user.

Implementations of the invention may include one or more of the following features. The means for disabling the operation of the active vehicle seat comprises setting the active vehicle seat to a predetermined orientation.

BRIEF DESCRIPTION OF THE DRAWINGS

This invention is described with particularity in the detailed description. The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
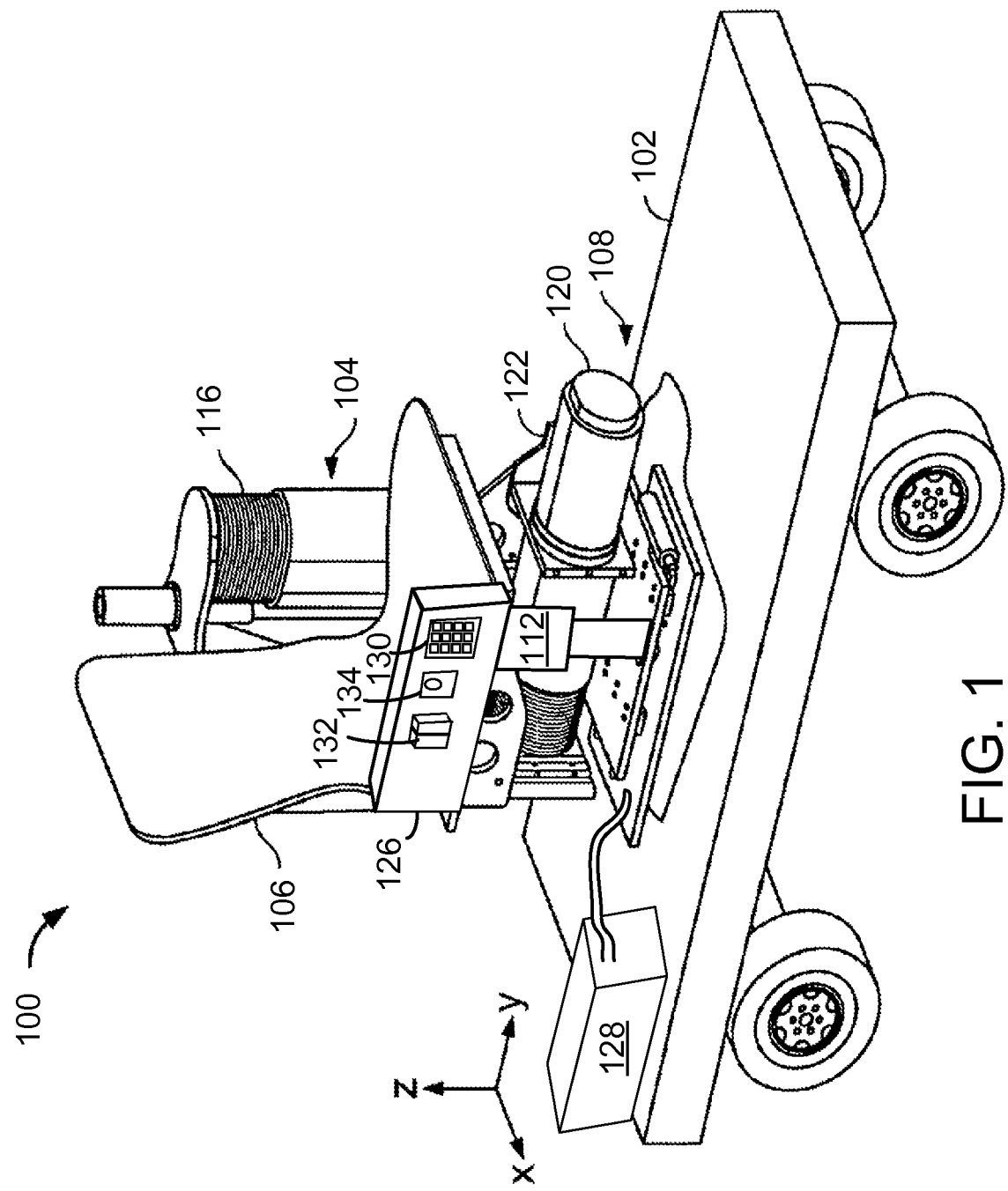
FIG. 1 is a perspective view of an active vehicle seat according to one embodiment.

FIG. 1 is a perspective view of an active vehicle seat 100 according to one embodiment. The active vehicle seat 100 is supported by a vehicle chassis 102. The active vehicle seat 100 includes a vertical active suspension element 104 for controlling the motion of a vehicle seat 106 along a vertical axis, z, and a longitudinal active suspension element 108 for controlling the motion of the vehicle seat 106 along a longitudinal axis, y. The motion of the vehicle seat 106 along a transverse axis, x, is affected by a passive suspension element 112, such as a spring or spring/damper based system.

The active suspension elements 104, 108 are in data communication with a control system 126. The control system 126 receives data signals, such as vehicle seat acceleration and the position of the vehicle seat 106 relative to the vehicle chassis 102, from the sensors 116, 122. In return, the control system 126 provides control signals that cause the actuators 104, 108 to exert forces that meet certain objectives such as tending to restore the vehicle seat 106 to an equilibrium position; and minimize the acceleration experienced by the vehicle seat 106. The data signals can represent position and acceleration of the vehicle seat 106 as well as data indicative of properties of the vehicle seat 106. More information relating to the active suspending of vehicle seats can be found in pending U.S. application Ser. No. 10/978,105 filed on Oct. 29, 2004, the entire disclosure of which is incorporated herein by reference.

A power source 128 is coupled to the control system 126. The control system 126 can include a controller comprising a component in a security system for the active vehicle seat 100. The power source 128 can also be coupled to the active suspension elements 104, 108. The control system 126 is coupled to the active suspension elements 104, 108. In one embodiment, the controller is a separate component that is coupled to the control system 126 of the active vehicle seat 100. The controller can disable power and/or control to the active suspension elements 104, 108. In one embodiment, the controller disables the passive suspension element 112.

In one embodiment, the controller signals the active suspension elements 104, 108 to position the active vehicle seat 100 to a predetermined orientation when the active vehicle seat 100 is unoccupied. In one embodiment, the predetermined orientation of the vehicle seat 100 is a position which renders the vehicle substantially inoperable. For example, the predetermined orientation can position the active vehicle seat 100 such that an operator is not physically able to occupy the vehicle seat 106. In one embodiment, the controller prevents the active vehicle seat 100 from moving from the predetermined orientation until the controller receives an authentication signal.

The authentication signal can be generated using various techniques. For example, a PIN pad 130 can be coupled to the controller. An authorized operator inputs a personal identification number (PIN) into the PIN pad 130. Inputting the correct PIN signals the controller to enable the active vehicle seat 100. An incorrect PIN prompts the PIN pad 130 to warn the controller of an unsuccessful attempt and can cause the controller to lock-out any further disarming attempts. In one embodiment, multiple unsuccessful attempts can be made before the controller locks-out the system.

In one embodiment, a card reader 132 can be used as an authentication device. A security card engages the card reader 132. For example, the security card can include a magnetic stripe. In one embodiment, a biometric sensor 134 can be used as an authentication device. The biometric sensor 134 can read biometric data from an authorized user. In another embodiment, a keyboard (not shown) can be used as an authentication device and can be configured to accept a password. In another embodiment, a touch screen display (not shown) can be used as an authentication device and can be configured to accept a password or a signature, for example.

In one embodiment, the active vehicle seat 100 operates as follows. During normal operation, the control system 126 actively suspends the vehicle seat 106 to minimize external vibrations experienced by the operator. The operator eventually exits the vehicle. The controller then positions the vehicle seat 106 to a predetermined orientation once the vehicle seat 106 is unoccupied and the security system is armed. The active vehicle seat 100 can include a sensor (not shown) that senses when the vehicle seat 106 is unoccupied. Alternatively, the operator could activate the security system upon exiting the vehicle. The predetermined orientation of the vehicle seat 106 can include a position which renders the vehicle substantially inoperable. For example, the vehicle seat 106 can be positioned such that it is physically impossible for an operator to occupy the vehicle seat 106.

Once activated, the controller monitors the state of the active vehicle seat 100. The controller can detect a triggering event related to a security threat to the active vehicle seat 100. The controller can then disable an operation of the active vehicle seat 100 in response to the detected triggering event. The controller prevents the active vehicle seat 100 from moving from the predetermined orientation until an authorized user disables the security system. The operation of the active vehicle seat is enabled by providing authentication of an authorized user. Upon authentication of an authorized user, the controller sets the active vehicle seat 100 to an initial position. The initial position allows the operator to occupy the vehicle seat 106. The control system 126 for the active vehicle seat 100 can then begin actively suspending the vehicle seat 106.

In the event of a security threat, the controller disables the operation of the active vehicle seat 100. For example, the controller can disable the control system 126 for the active vehicle seat 100. Once disabled, the control system 126 will not control the active suspension of the active vehicle seat 100. Additionally, the thief cannot enable the control system 126 even if the active vehicle seat 100 is installed into another vehicle.

In other embodiments, the controller can disable an electrical, pneumatic, and/or hydraulic connection to the active vehicle seat 100. For example, the controller can interrupt an electrical connection to the active suspension elements 104, 108, thereby preventing power and/or control signals from reaching the active suspension elements 104, 108. The controller can also interrupt a pneumatic connection to the passive suspension element 112.

Figure 2:
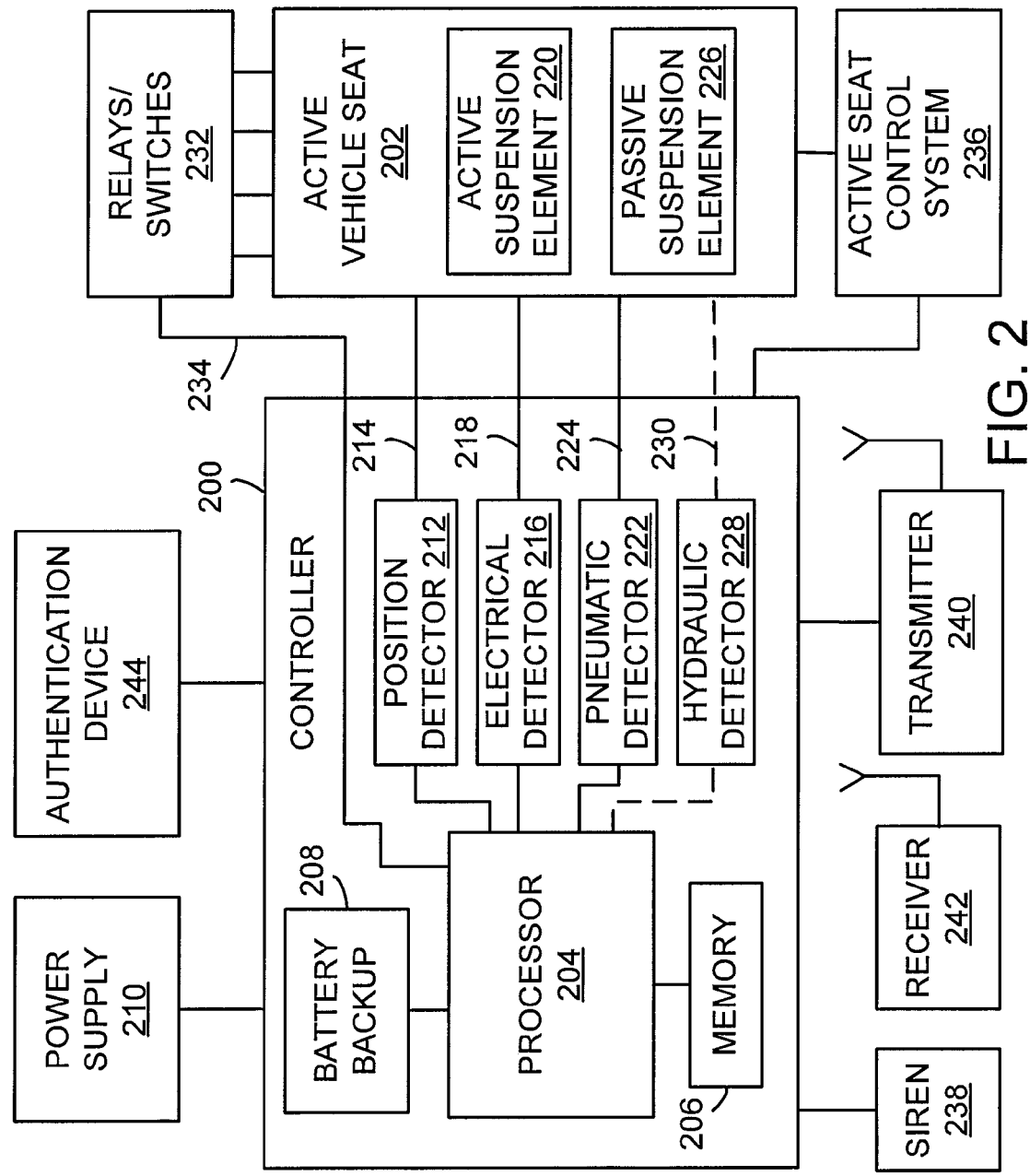
FIG. 2 is a block diagram of one embodiment of a controller for an active vehicle seat.

FIG. 2 is a block diagram of one embodiment of a controller 200 for an active vehicle seat 202. The controller 200 includes a processor 204 for executing instructions residing in memory 206. Processor 204 can be a microprocessor, ASIC, DSP, or any other suitable device having processing capability. Memory 206 can include random access memory (RAM), read only memory (ROM), flash memory, hard drive memory, EPROM, or any other suitable memory. A backup power source 208, such as a battery, can be coupled to the processor 204. The backup power source 208 provides power to the processor 204 when the main power supply 210 is disconnected and/or disabled.

The controller 200 is coupled to the active vehicle seat 202 through various signal lines. The controller 200 includes a position detector 212. The position detector 212 can be coupled to a position sensor (not shown) on the active vehicle seat 202 through a position signal line 214. The position sensor measures a change in position of the active vehicle seat 202 and outputs a position signal. The position detector 212 receives the position signal which is related to a change in position of the active vehicle seat 202. The change in position could signify a security threat to the active vehicle seat 202.

The controller 200 includes an electrical detector 216. The electrical detector 216 is coupled to an electrical power line (not shown) through an electrical signal line 218. The electrical power line provides power to an active suspension element 220 of the active vehicle seat 202. The electrical detector 216 detects a short (open circuit condition) in the electrical power line which could signify a security threat to the active vehicle seat 202.

The controller 200 includes a pneumatic detector 222. The pneumatic detector 222 is coupled to a pneumatic line (not shown) through a pneumatic coupling 224. The pneumatic line provides air to an optional passive suspension element 226 which supports the static load of the active Vehicle seat 202. The pneumatic detector 222 detects a leak in the pneumatic line which could signify a security threat to the active vehicle seat 202.

The controller 200 can optionally include a hydraulic detector 228. The hydraulic detector 228 is coupled to an optional hydraulic line (not shown) through a hydraulic coupling 230. The hydraulic line provides fluid to an optional passive suspension element 226 which supports the static load of the active vehicle seat 202. The hydraulic detector 228 detects a break in the hydraulic line which could signify a security threat to the active vehicle seat 202.

The processor 204 can be coupled to various switches/relays 232 through one or more control lines 234. The switches/relays 232 can be integrated with or can be separate from the controller 200. The switches/relays 232 control power, air, and/or fluids delivered to the active and passive suspension elements 220, 226 in the active vehicle seat 202. The processor 204 controls the switches/relays 232 based on data received from the various detectors 212, 216, 222, and 228. For example, the processor 204 can instruct the relays/switches 232 to cut power to the active suspension element 220 of the active vehicle seat 202 in the event of a security threat, thereby disabling the operation of the active vehicle seat 202.

The controller 200 can also be coupled to an active seat control system 236. The active seat control system 236 controls the active suspending operation of the active vehicle seat 202. The controller 200 can signal the control system 236 to disable the operation of the active vehicle seat 202 in the event of a security threat.

In one embodiment, the controller 200 can also activate a siren 238. The siren 238 outputs an audible signal in the event of a security threat to the active vehicle seat 202. In one embodiment, a transmitter 240 is coupled to the controller 200. The transmitter 240 can send a page, text message, voice message, or other signal to a receiver 242, such as a pager, personal digital assistant (PDA), cellular telephone, laptop, or other wireless device.

An authentication device 244 can be coupled to the controller 200. The authentication device 244 can include a personal identification number (PIN) pad device, card reader device, keyboard device, biometric device, voice recognition device, radio frequency identification (RFID) reader, or any other device that can verify or authenticate user authorization to the controller 200. For example, a card reader device can authenticate a user that swipes an approved security card through the card reader. A PIN pad device can authenticate a user that enters the correct PIN number into the PIN pad device. A RFID reader can authenticate a user that possesses an authenticated RFID tag.

The controller 200 can include various other components and circuitry (not shown). The illustrative controller 200 shown in FIG. 2 is a high level block diagram of one possible configuration and is not intended to limit the design of the controller 200 in any way. For example, the controller 200 can include additional circuitry for providing additional functionality. In one embodiment, the controller 200 is integrated with the control system 236 of the active vehicle seat 202. As previously described, the control system 236 processes active suspending algorithms and transmits control signals to the active suspension element 220 based on the algorithms.

Figure 3:
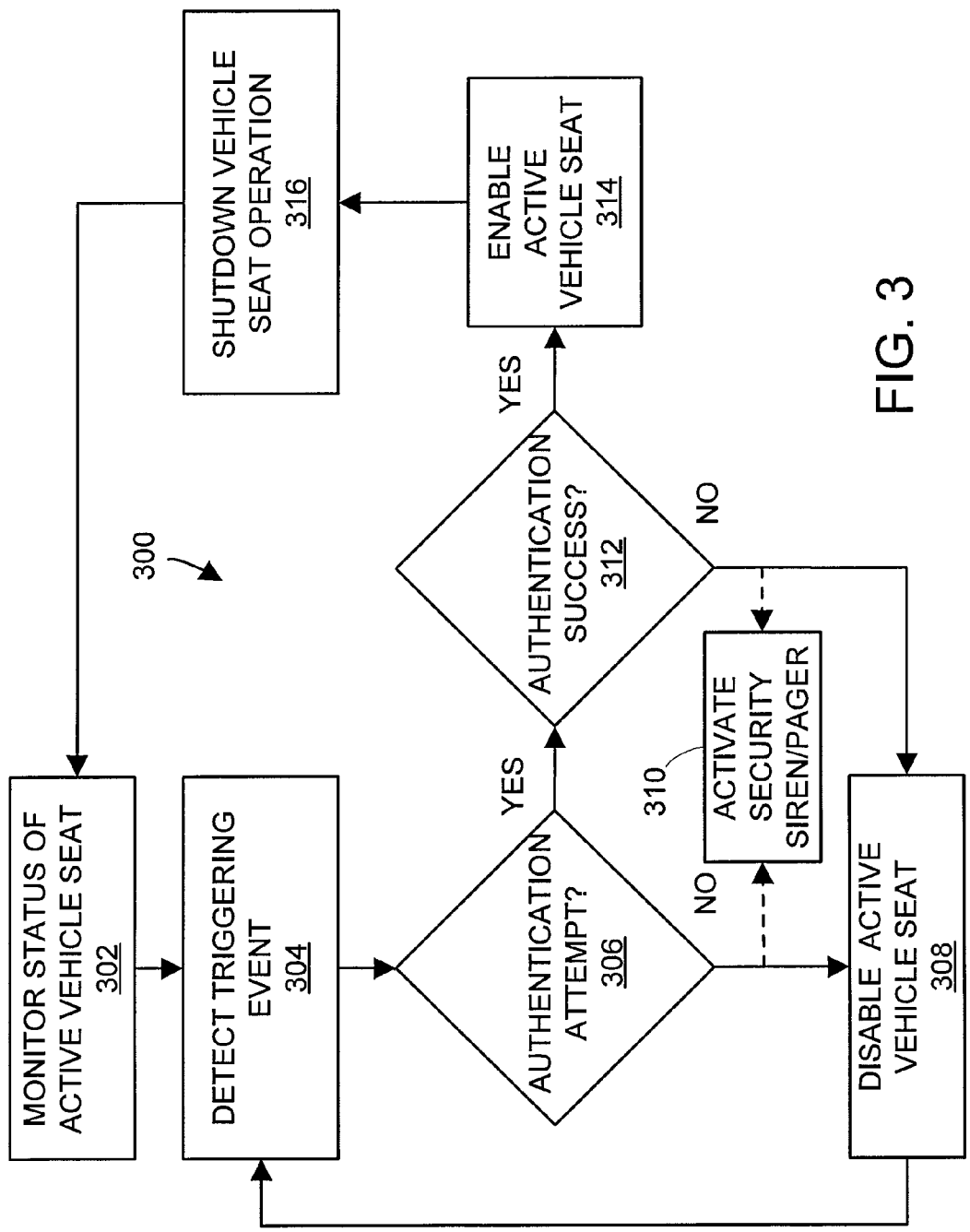
FIG. 3 is a flowchart of a method of operating an active vehicle seat according to one embodiment.

FIG. 3 illustrates a flowchart 300 of a method of operating an active vehicle seat according to one embodiment. The illustrated method steps can be executed in any sequence and the method is not limited to the sequence shown. Additionally, the method can include additional steps not shown, in the illustrated embodiment.

In a first step 302, the controller 200 (FIG. 2) monitors the status of the active vehicle seat 202. The monitoring can occur at various time intervals or substantially continuously. In one embodiment, the monitoring can include sensing whether the active vehicle seat 202 has been subjected to tampering.

In a next step 304, the controller 200 detects a triggering event. The triggering event can include an attempt to steal the active vehicle seat 202. For example, a thief can disconnect at least one of an electrical, pneumatic, or hydraulic connection to the active vehicle seat 202. The triggering event can include an attempt to authenticate an authorized user of the active vehicle seat 202.

In another step 306, the controller 200 determines whether an authentication attempt is being made. The active vehicle seat is disabled (step 308) if the controller 200 determines it is not an authentication attempt. An alarm siren and/or a pager can optionally be activated (step 310). If the controller 200 determines that an authentication attempt is being made (step 306), the controller 200 then confirms whether the attempt is successful (step 312).

A successful authentication enables an operation of the active vehicle seat 202 (step 314). An unsuccessful authentication attempt disables the active vehicle seat 202 (step 308) and locks out further authentication attempts. The system can be configured such that multiple authentication attempts can be made before the system disables the active vehicle seat 202 and locks out further authentication attempts. Additionally, an alarm siren and/or a pager can optionally be activated (step 310) upon one or more unsuccessful authentication attempts. The controller 200 monitors the status of the active vehicle seat 202 (step 302) when the operation of the active vehicle seat 202 is terminated by the operator (step 316).

The method can include various additional steps not shown in the illustrated embodiment. For example, when an operator exits the vehicle, the controller 200 can orient the active vehicle seat 202 to a position that makes is substantially impossible to operate the vehicle. The position of the vehicle seat 202 can remain in this orientation until an authorized user disables the security system. This orientation can also prevent a theft of the vehicle since the vehicle is not operable. The method can include the step of electrifying the chassis of the active vehicle seat 202 to deter a thief from tampering with the power lines and the mounting hardware. For example, the controller 200 can administer a mild shock to the thief upon sensing the tampering.

The method can also include the step of authenticating a user using a security code, a security card or biometric data, such as a fingerprint, for example. Each of these authentication methods requires additional hardware as previously discussed.

The foregoing description is intended to be merely illustrative of the present invention and should not be construed as limiting the appended claims to any particular embodiment or group of embodiments. Thus, while the present invention has been described with reference to exemplary embodiments, it should also be appreciated that numerous modifications and alternative embodiments may be devised by those having ordinary skill in the art without departing from the broader and intended spirit and scope of the present invention as set forth in the claims that follow. In addition, the section headings included herein are intended to facilitate a review but are not intended to limit the scope of the present invention. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

What is claimed is:

1. A method for operating an active vehicle seat in a vehicle, the method comprising:
   detecting a triggering event related to a threat of theft of the active vehicle seat from the vehicle, wherein the triggering event comprises at least one of a severed mechanical, pneumatic, and hydraulic connection to the active vehicle seat;
   disabling an operation of the active vehicle seat in response to the detected triggering event, the disabling including at least one of disabling an exerting of forces to restore the active vehicle seat to an equilibrium position and disabling an exerting of forces to minimize the acceleration experienced by the active vehicle seat; and
   enabling the operation of the active vehicle seat by providing authentication of an authorized user.

2. The method of claim 1 wherein disabling the operation comprises disconnecting power to the active vehicle seat.

3. The method of claim 1 wherein disabling the operation comprises outputting an audible signal.

4. The method of claim 1 wherein the providing authentication comprises entering a password.

5. The method of claim 1 wherein the providing authentication comprises entering biometric data.

6. The method of claim 1 wherein the providing authentication comprises turning a key in a lock.

7. The method of claim 1 wherein the providing authentication comprises engaging a security card with a card reader.

8. An active vehicle seat comprising:
   a vehicle seat;
   an electromagnetic actuator that actively suspends the vehicle seat during operation; and
   a controller that detects a triggering event related to a threat of theft of the active vehicle seat from the vehicle, the triggering event comprising at least one of a severed mechanical, pneumatic, and hydraulic connection to the active vehicle seat, the controller disabling the operation of the active vehicle seat in response to the detected triggering event and subsequently enabling the operation of the active vehicle seat by providing authentication of an authorized user, the disabling including at least one of disabling an exerting of forces to restore the active vehicle seat to an equilibrium position and disabling an exerting of forces to minimize the acceleration experienced by the active vehicle seat.

9. The active vehicle seat of claim 8 wherein the controller disables the operation of the active vehicle seat by disconnecting power to the active vehicle seat.

10. The active vehicle seat of claim 8 further comprising an authentication device coupled to the controller for enabling the operation the active vehicle seat.

11. The active vehicle seat of claim 10 wherein the authentication device comprises a keypad for entering of a preset security code.

12. The active vehicle seat of claim 10 wherein the authentication device comprises a lock for engagement with a corresponding key.

13. The active vehicle seat of claim 10 wherein the authentication device comprises a card reader for engagement with a security card.

14. The active vehicle seat of claim 10 wherein the authentication device comprises a biometric sensor for receiving biometric data.

15. The active vehicle seat of claim 8 further comprising a loudspeaker that outputs an audible signal in response to the triggering event.

16. The active vehicle seat of claim 8 further comprising a wireless transmitter that signals a corresponding wireless receiver in response to the triggering event.

17. An active vehicle seat comprising:
   means for detecting a triggering event related to a threat of theft of the active vehicle seat from the vehicle the triggering event comprising at least one of a severed mechanical, pneumatic, and hydraulic connection to the active vehicle seat;
   means for disabling an operation of the active vehicle seat in response to the detected triggering event; and
   means for enabling the operation of the active vehicle seat by providing authentication of an authorized user, wherein the means for disabling an operation of the vehicle comprises at least one of means for disabling an exerting forces to restore the active vehicle seat to an equilibrium position and means for disabling an exerting of forces to minimize the acceleration experienced by the active vehicle seat.

* * * * *